INVENTOR
Ephraim W. Hogue
BY Arthur Vinograd ATTORNEY
Leonard F. Stoll AGENT

July 19, 1960 E. W. HOGUE 2,946,046

MAGNETIC DIGITAL COMPUTER CIRCUIT

Filed Nov. 16, 1956 4 Sheets-Sheet 2

INVENTOR

Ephraim W. Hogue

BY

Arthur Vinograd

Leonard F. Stoll ATTORNEY AGENT

INVENTOR
Ephraim W. Hogue
BY Arthur Vinograd
Leonard F. Stoll ATTORNEY AGENT

July 19, 1960 E. W. HOGUE 2,946,046
MAGNETIC DIGITAL COMPUTER CIRCUIT
Filed Nov. 16, 1956 4 Sheets-Sheet 4

INVENTOR
Ephraim W. Hogue
BY
Arthur Vinograd
Leonard F. Stoll
ATTORNEY
AGENT

United States Patent Office 2,946,046

Patented July 19, 1960

2,946,046

MAGNETIC DIGITAL COMPUTER CIRCUIT

Ephraim W. Hogue, Bethesda, Md., assignor to the United States of America as represented by the Secretary of Commerce Filed Nov. 16, 1956, Ser. No. 622,723

8 Claims. (Cl. 340—174)

The present invention relates to magnetic core type circuits and is particularly adaptable for performing logical operations in connection with digital computers.

As is well known, various arithmetic and other operations performed by modern high-speed electronic digital computers such as the NBS SEAC or improved DYSEAC are based on logical algebraic considerations enabling the solution of relatively complex equations and functions to be readily implemented by means of a few standardized components such as an and-gate, or-gate, and pulse-repeater stage. See "Dynamic Circuit Techniques Used in SEAC and DYSEAC" by Elbourn and Witt, "Proceedings of the I.R.E., vol. 41, No. 10, October 1953, pages 1380–1387.

Such components normally employ electronic amplifying tubes as components of the gating and repeater stages. It can be shown that the transfer characteristic of a linear amplifier such as one employing conventional electronic tube circuitry has a gain of unity up to its saturation level S as represented by the straight-line characteristic O—P in Fig. 9. Only if a signal of amplitude S represents a binary one and a total absence of a signal represents a binary zero, then it will be apparent that an amplifier having such referred-to type of transfer characteristic will transmit perfect ones and perfect zeroes without distortion. It cannot, however, emit perfect signals unless it receives perfect signals. A long cascade or closed loop of such amplifiers would therefore be incapable of transmitting binary signals with stability.

The transfer characteristic curve O—A—B—P shown in Fig. 9, on the other hand, which is a volt-second representation of the response characteristic of a magnetic amplifier, represents conditions which would enable an amplifier to emit perfect zeros and perfect ones within limits in response to the reception of imperfect corresponding signals. In other words, the regions defined by O—A and B—P in Fig. 9 represent respectively regions of tolerances obtained by shifting the points P and O in the transfer characteristic to A and B respectively. In accordance with the principles of the present invention, magnetic amplification is employed in place of conventional electronic tube circuitry to obtain transfer characteristics corresponding to the curve O—A—B—P. By cascading the circuits of this invention it is also possible to extend the transfer characteristic to almost an idealized condition as represented by curve O—A—C—D—B—P. The present invention therefore contemplates the implementation of the referred-to types of logical circuitry by means of saturable core components in place of electronic tubes.

An immediate object of the present invention is to provide a logical circuit that is adaptable as a gating and repeater stage but which dispenses with the need for electronic tubes.

It is a further object of this invention to provide a saturable core logical circuit that has good stability in closed-loop operation, good tolerance to variations in amplitude of the clock or timing pulses employed and good tolerance to variations in component values.

An additional object of this invention is to provide a logical-type circuit having relatively few components, which is simple in construction and employs ground-referenced bias and clock potentials.

The invention further contemplates a saturable-core circuit requiring relatively few windings on the core element.

A still further object of this invention is to provide a saturable core logical circuit that requires very little power, that will operate on core minor-loops and in which the current through the diodes and resistor components are independent of the logical load.

Still another object of this invention is to provide a saturable core logical circuit that can be employed as a signal repeater, a logical gate, or as a complementer.

Other uses and advantages of the invention will become apparent upon reference to the specification and drawings.

In accordance with the principles of this invention the behavior of a saturable core reactor having a substantially rectangular loop hysteresis characteristic is determined by a biasing signal of alternating polarity in a manner such that the core exhibits an inductive effect only when driven through one portion of its hysteresis loop.

In the description of the drawings to follow, like parts are designated by the same reference legends. For convenience of reference, moreover, the input diodes in the various modifications are designated as $D_i$; the clock diodes by $D_k$, the clock pulse source by CP and the saturable core reactors by T.

Figure 1:
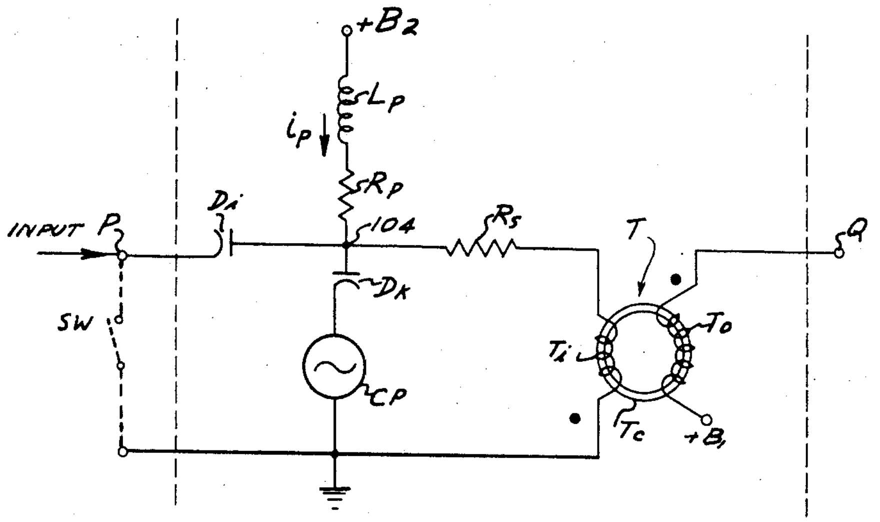
Fig. 1 is a circuit diagram showing a basic stage employing the principles of the present invention.

Fig. 1 shows a basic stage illustrating the principles of the invention. Such stage includes a reactor T comprising a magnetic core $T_c$ which may be made of a rectangular loop ferrite such as that identified under the trade name MF1118. The reactor T also includes a primary or input winding $T_i$ and a secondary or output winding $T_o$ wound around the core with polarities as indicated. The secondary winding $T_o$ is connected to an output terminal Q and to a bias voltage source $+B_1$. The amplitude of the bias voltage source $+B_1$ is slightly above ground potential and is sufficient to keep the asymmetrical conducting device with which such potential source may be associated (in the next ensuing stage) as will be described, back-biased during "ones" mode transmission. The ratio between the reactor secondary and primary windings $T_o/T_i$ is preferably greater than one, and may have different values; specifically, a ratio of approximately 2:1 is considered satisfactory in connection with a practical embodiment of the present invention. The broken line representations shown in Fig. 1 and elsewhere in the drawings are employed to delineate a particular stage.

The primary winding $T_i$ as shown in Fig. 1 is connected through a current limiting resistor $R_s$ to a common terminal 104. Resistor $R_s$ serves two important purposes. It limits the flow of the current and also establishes an input voltage threshold for the stage for the purpose of increasing the stability of "zero" transmission, to be described, especially in closed loop operations. The anodes of a first clock, and second input unidirectional asymmetrical conducting device $D_k$, $D_i$ respectively, each of which may be in the form of a semiconductor or other device which changes its impedance according to the polarity of the potential across its terminals, are connected to terminal 104. The cathode electrode of the asymmetrical device $D_k$ is connected to a source of clock or timing pulses CP which is grounded at one end as shown. The clock pulse source CP may be in the form of any conventional sine-wave generator or a generator providing an output signal of alternating polarity and is thereby effective in biasing the clock diode $D_k$ to alternate states of conductivity.

The cathode of the input diode $D_i$ is connected to an input terminal designated as P. A load or pull-up resistor $R_p$ in series with an impedance coil $L_p$ connects the common terminal 104 to a second positive bias source $+B_2$ which may be at a higher voltage level than the maximum peak voltage of the clock-pulse source signal. The potential source $+B_2$ serves as a source of magnetizing current for the reactor T as will be described. The impedance of the coil $L_p$ is selected so as to have a high reactance at the frequency of the clock signals from source CP. It will be understood that when the input diode $D_i$ in Fig. 1 is connected to a previous identical stage (see Fig. 3, for example) the bias voltage $+B_1$ from that previous stage will be applied to the input diode $D_i$. If no preceding stage is employed then a switch such as SW as symbolized in dotted line representation can be employed to perform the required effect of clamping the input electrode of $D_i$ to ground potential.

Figure 2A:
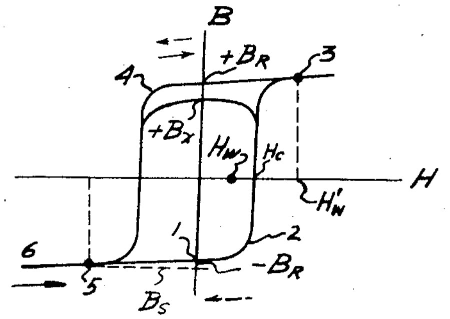
Fig. 2A is a curve showing the hysteresis characteristics of a typical magnetic core material employed in the present invention.

The operation of the circuit embodiment shown in Fig. 1 can best be explained by first briefly considering the magnetization effects inherent in a magnetic core material of the type described as symbolized in Fig. 2A.

Fig. 2A is a hysteresis characteristic for the material comprising the core $T_c$. As is conventional, the magnetizing force H is designated along the abscissa while the flux B is represented on the ordinate of the diagram. As is well known in permanent magnetic materials such as comprises the core $T_c$ in the present case, magnetic polarization remains after the removal of the applied polarizing force. That is, at least two different remnant states of magnetic polarization can be induced in the core material consequent to the application of distinct polarizing forces. Once the core material is placed in either of the two stable states $+B_r$ or $-B_r$, no application of power is required to maintain such states.

The application of a magnetizing current to the primary coil $T_i$ on the core $T_c$ shown in Fig. 1 will produce a magnetizing force H in the core, which will thereby assume either one of two conditions depending on the direction of the applied current. That is, the application of a positive magnetizing current of sufficient magnitude such as $2H_w$ will magnetize the core so that it will be in a state represented by conditions $+B_r$ in Fig. 2 while the application of a negative current will magnetize the core to a condition corresponding to $-B_r$ indicated on the hysteresis loop diagram. The subsequent removal of the magnetizing current does not affect these conditions.

The point $+B_r$ on the hysteresis loop of Fig. 2 may be identified as the point of positive residual or remnant magnetization while point $-B_r$ corresponds to a state or condition of negative residual magnetization. The points 3 and 5 on the hysteresis loop represent positions of positive and negative magnetic saturations respectively. The broken line $B_s$ in Fig. 2A indicates the maximum or saturation value of magnetic induction while the line designated as $+B_x$ symbolically illustrates a remnant condition or state of magnetization which can be achieved below saturation.

The core material empoyed in the present invention should have a $$\frac{B_s-B_r}{B_r}$$

value as close to zero as possible. It is preferable also that the value of $H_c$ should be small and that of $B_r$ as large as possible.

The characteristic behavior of magnetic material such as that employed in the core in connection with the present invention is such that the application of a magnetizing force H that tends to drive the core from a point of residual magnetization to a point of magnetic saturation of the same polarity (i.e. point $+B_r$ to 3 or point $-B_r$ to 5 respectively in Fig. 2A) cannot cause a change in the magnetic state or condition of the core and the resultant flux change will produce only a very small output signal.

On the other hand if the magnetizing force tends to drive the core from a point of residual magnetization to a point of magnetic saturation of opposite polarity, (i.e. from point $-B_r$ to point 3 in Fig. 2A, for example) then an abrupt change in magnetic state occurs and the resultant flux change is sufficient to produce a large and significant output or inductive effect. Moreover, it can be assumed that when an excitation current of positive polarity is applied to the primary magnetizing winding $T_i$ (Fig. 1) on the core, the magnetizing force H will tend to drive the core in the direction indicated by the solid arrows, shown on the hysteresis loop in Fig. 2A; namely counterclockwise from the negative residual magnetization point $-B_r$ and clockwise relative to the positive residual magnetization point $+B_r$. Similarly, a reversal of the applied excitation current will change the direction of such driving force to that indicated by the dotted arrows shown in Fig. 2A with respect to each residual point.

The characteristics of the core material represented by the hysteresis loop of Fig. 2A therefore are such that the application of a current to produce a magnetizing force of H when the core is initially in condition $-B_r$, will drive the core to a state indicated by the point 2 represented on the hysteresis loop. Because of the substantially rectangular nature of the curve, however, upon removal of such magnetizing force, the core will revert to state $-B_r$ or to be more exact, to a state close to $-B_r$, because the force of magnetization $H_w$ is insufficient to drive the core beyond the "knee" 2 of the hysteresis loop. Similarly, if the core had previously been magnetized to condition $+B_r$, and current is subsequently applied to produce a like magnetizing force $H_w$, the core will be forced to a state corresponding to point 3 on the hysteresis loop and will revert to state $+B_r$ upon removal of the current. In other words, the application to the core of a current less than that corresponding to a magnetizing force of $H_c$ in Fig. 2 will not produce a permanent change of state or condition; that is, a change from $-B_r$ to $+B_r$ or vice versa.

Assuming the same condition of magnetization of the core, that is, with the core initially in either of the conditions represented by points $-B_r$ or $+B_r$, the application of a current sufficient to produce a magnetizing force of $H'_w$ for example, will be effective to produce a change in the state or condition of remnant magnetization of the core, the resulting large flux change enabling a correspondingly large signal output. If the core were originally at point $-B_r$ on the curve, the application of a magnetizing current corresponding to such magnetizing force $H'_w$ will drive the core counter-clockwise in the direction of the solid arrow along the hysteresis loop to state 3, and, upon removal of such current it will now assume condition $+B_r$, instead of reverting to state $-B_r$. On the other hand, if the core were initially magnetized to condition $+B_r$, the application of a magnetizing force $H'_w$ would only have the effect of forcing the core clockwise in the direction of the solid arrow shown along the hysteresis loop to state 3 and upon removal of the magnetizing force, the core would revert to condition $+B_r$. It may be observed at this point that if the direction of current flow in the magnetizing coil were reversed then the core would be driven clockwise from state $-B_r$ and counter-clockwise from state $+B_r$ as indicated by the dotted arrows.

It is evident from the above considerations that, because of the rectangular configuration of the hysteresis loop characterizing core elements made of the referred-to material and the presence of the relatively sharp "knees" or bends in the curve consequent thereto, the core can discriminate between magnetizing currents corresponding to the magnetizing forces $H_w$ and $H'_w$ respectively, and that a change of state or condition can be manifested as a result of such discrimination.

With the above basic considerations in mind the construction and operation of the circuit shown in Fig. 1 will become apparent. Fig. 1 shows a basic form of the invention employed as a signal repeater. That is, such circuit repeats at the output terminal Q a signal representing, for example, a binary digit applied at input terminal P. It will also be shown that several stages of such circuit can be serially connected as in Fig. 3 by connecting the input terminal P of a subsequent stage to the output terminal Q of a preceding stage. By such arrangement, and by suitable design of each stage, a chain or cascade of stages can be made to have an overall logical amplifying power equal to the product of the amplification of amplifying powers of the stages. A multistage binary repeater having very high logical amplifying power can thus be constructed.

Figure 8:
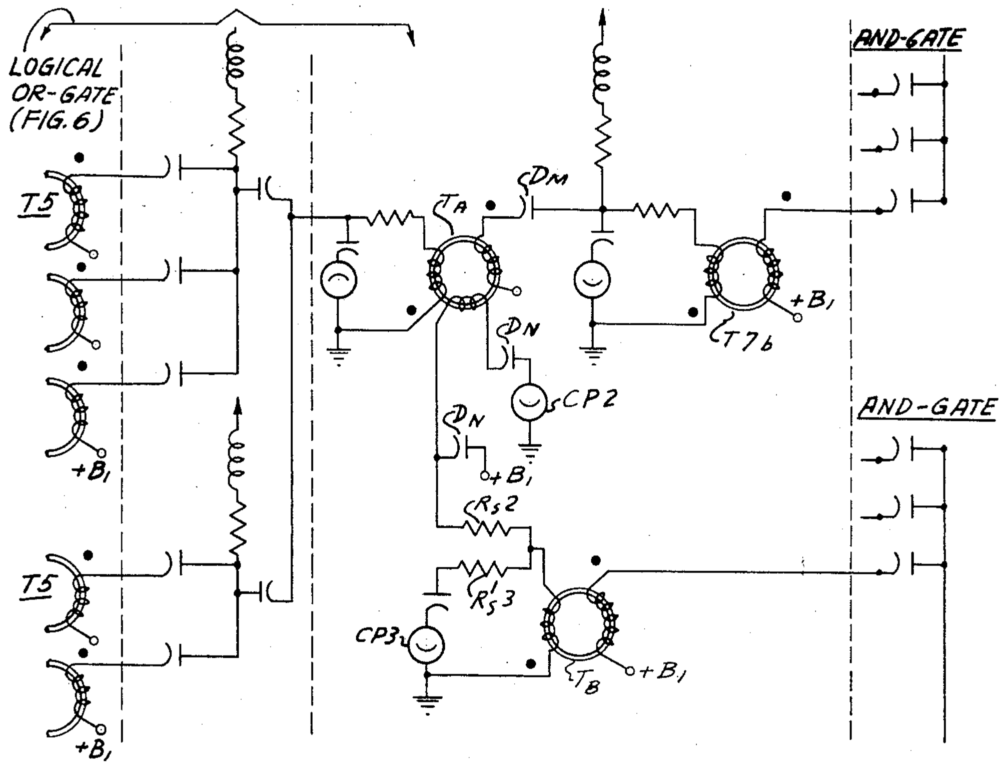
Fig. 8 is a circuit diagram showing the principles of the present invention incorporated in an electronic "package" such as can be employed in connection with an electronic computer.
Figure 7:
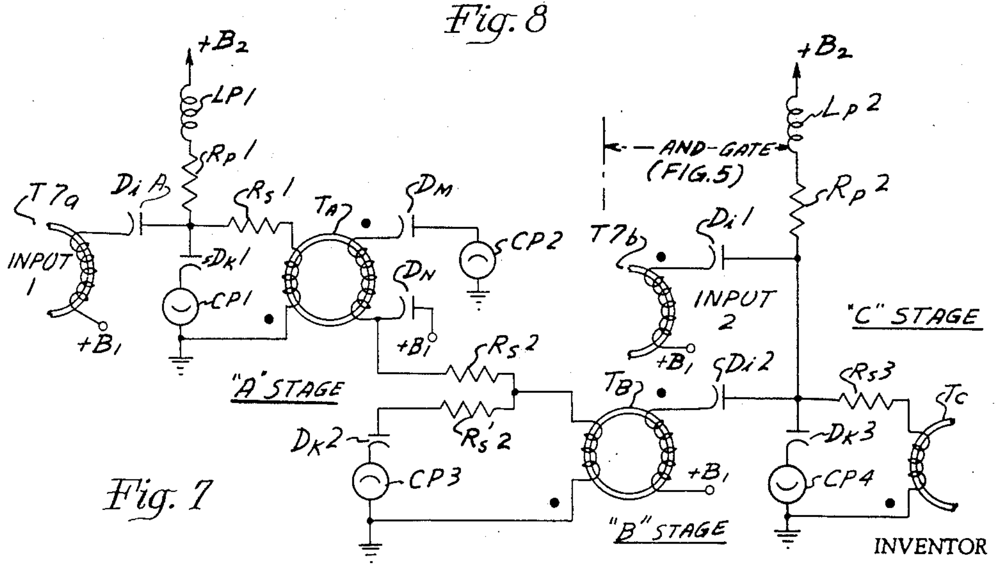
Fig. 7 shows an inhibit or signal complementing gate constructed in accordance with the principles of the present invention.

As will also be made apparent, two repeater stages of the type illustrated in Fig. 1 can be connected so as to perform a signal complementing function as in Fig. 7, in which the binary "ones" are obtained at the output terminal in response to an applied binary "zero" and vice versa. In addition as will also be shown, the basic circuit of Fig. 1 can be implemented into a complex repeater consisting of cascaded and complementing stages in conjunction with diode-type gates to provide logical amplification as well as logical gating and storage functions required in digital computing circuits as is illustrated in Fig. 8.

The previously identified clock source CP shown in Fig. 1 is a low-impedance source of signals of alternating polarity such as a conventional sine-wave generator. The stage shown in Fig. 1 has two distinct modes of operation which, for purposes of discussion will be identified as a binary "one" and binary "zero" mode respectively.

*Binary "one" mode.*—In operation according to the binary "one" mode, the input terminal P may be considered as unconnected, (that is SW is open) in which case a positive signal applied to input terminal P will maintain the potential of the cathode terminal of input diode $D_i$ equal to or slightly positive with respect to the potential of its anode electrode. Under such condition little or no current will flow through the input diode of $D_i$. The magnitude of the positive potential $+B_2$ applied to the impedance member $L_p$ is chosen near to or somewhat greater than the peak value of the clock pulse source as previously mentioned and the value of the resistor $R_p$ is chosen so that the current $i_p$ flowing therethrough will be just enought greater than the maximum current drawn by the input winding $T_i$ to keep the clock diode $D_k$ conducting at all times. Because the impedance $L_p$ is chosen so as to have a large reactance compared with the circuit impedance from terminal 104 to ground, the value of $i_p$ remains constant throughout the clock cycle. The value of the current-limiting resistor $R_s$ is chosen so that approximately one-half of the A.C. voltage at terminal 104 will be impressed across input winding $T_i$.

At the beginning of a positive half-cycle of the clock voltage from source CP, the clock diode $D_k$ will be conducting and terminal 104 will therefore be at ground potential. Since input diode $D_i$ is approximately at cutoff under the assumed mode of operation, all of the current $i_p$ will flow through clock diode $D_k$. As the clock voltage increases positively, a progressively increasing portion of the current $i_p$ will be diverted through the magnetizing circuit comprising primary winding $T_i$ of reactor T.

The effect of the current flow in the primary winding $T_i$ will be apparent from the previously considered discussion of Fig. 2. The current $i_p$ will have a magnetizing effect and the core $T_c$ of the reactor will be driven from state $-B_r$ to state 2 on the hysteresis loop. However, as long as the value of such magnetizing current is such as to produce a magnetizing force corresponding to approximately only $H_w$, there will be no appreciable change of flux and no significant inductive effects will be manifested by the reactor T comprising the core $T_c$. Since the amount of current $i_p$ diverted to primary winding $T_i$ increases as the clock pulse becomes more positive, the magnetizing force will then correspond to $H_c$ in Fig. 2. The core will consequently be driven beyond the knee portion 2 of the hysteresis loop. As indicated by the slope of the hysteresis curve in this region, a large flux change is manifested and the inductance of the input winding $T_i$ becomes very large. Such action prevents further change in the portion of the current $i_p$ flowing through the primary winding $T_i$ circuit and such portion of the current is in fact held constant throughout the remainder of the positive half-cycle of the clock source. Because of the inductive action and the referred-to assumed 2:1 ratio of turns between the secondary and primary windings of reactor T, a voltage signal equal to twice the voltage applied to the primary $T_i$ will appear at output terminal Q. That is, at a certain point in the clock cycle, the reactor T comprising core $T_c$ becomes a voltage transformer having a primary inductance in series with the resistor $R_s$. Moreover, since the current is held constant while the core $T_c$ is in the state defined by the region 2–3 in Fig. 2, the IR drop across $R_s$ is constant and the voltage applied to the primary winding $T_i$ must therefore necessarily follow the voltage level at terminal 104. As a result, since such IR drop is approximately one-half the peak value of the clock voltage, the voltage wave on the primary winding $T_i$ will be approximately the same form as the upper-half of the clock half-sine wave. The output voltage at output terminal Q will also have a similar shape, but because of the 2:1 step up ratio provided between the secondary and primary windings of the reactor T the amplitude of such voltage will correspond to that of the clock sine-wave. Because of saturation of the core $T_c$ of the reactor as evidenced by points 3 and 5 on the hysteresis loop of Fig. 2A, the actual waveform transmitted by the core does not exactly correspond to that of the upper portion of a half-sine wave. The reactor in other words is effective as a transformer only in the regions defined by points 2—3 and 4—5 respectively on the hysteresis loop.

In this manner, the core, when in an unsaturated state behaves as a high impedance reactor with respect to the primary winding $T_i$ and as an efficient voltage step-up transformer with respect to both the primary and second windings. In its saturated state, the core becomes a low-impedance reactor with respect to the secondary or output winding.

The maximum voltage-time integral which the input winding $T_i$ will support is proportional to the length of such defined intervals. In other words, it is proportional to the largest flux-change possible for the core.

In major loop operation the voltage-time integral of the upper portion of the half-sine wave from clock source CP slightly exceeds the maximum value supportable by the core $T_c$ and consequently, the clock wave is not completely transmitted. In addition, because the voltage drop across the input diode $D_i$ adds to the amplitude of the clock voltage during the referred-to positive half-cycle, and subtracts from it during the negative half-cycle, the core $T_c$ becomes saturated sooner in the former case than in the latter. Therefore, a more complete waveform is transmitted on the negative clock stroke than during the positive.

Figure 3:
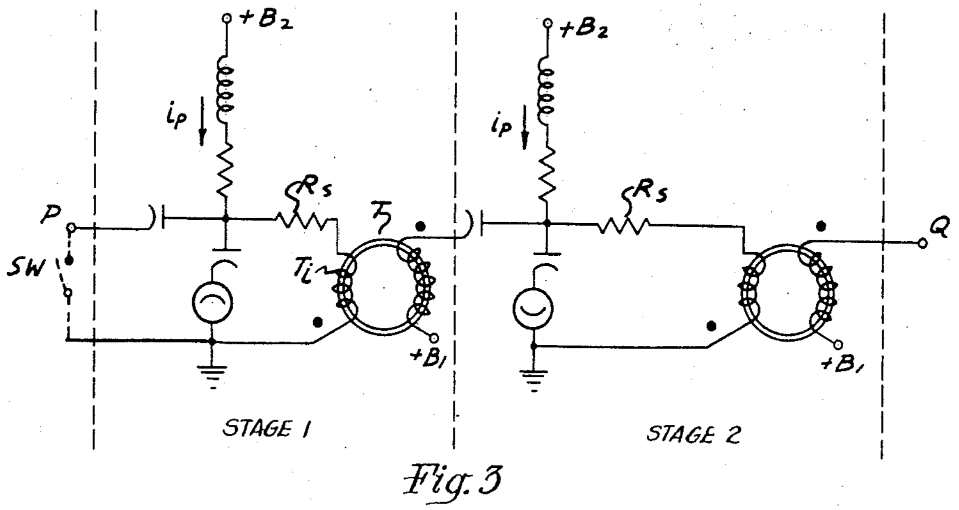
Fig. 3 is a circuit diagram showing a plurality of circuit stages of the type shown in Fig. 1 connected in cascade.

For a cascaded system in which the input terminal of a stage such as is exemplified in Fig. 1 is connected to the output terminal Q of a preceding stage as in Fig. 3, it will be apparent from the above description, that the core $T_c$ transmits a signal during the negative half-cycle of the clock pulse, and receives during the positive half-cycle. That is, the core, when receiving has enough time to become completely reset before the core in the stage that is transmitting to it saturates.

Figure 2B:
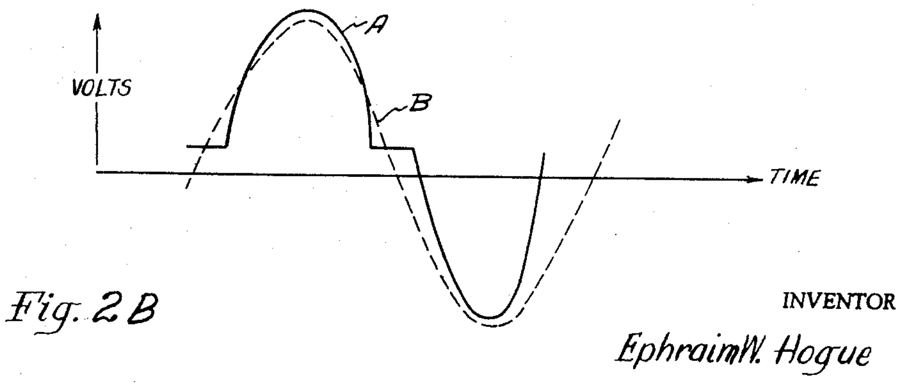
Fig. 2B shows curves illustrating certain of the waveforms involved.
Figure 4:
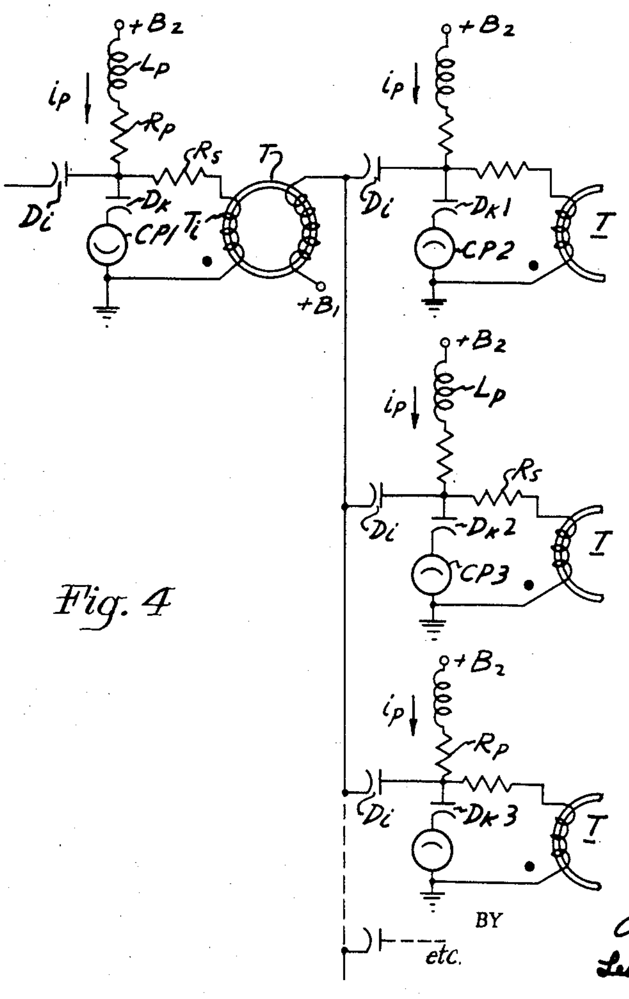
Fig. 4 shows the basic stage of Fig. 1 incorporated in a series parallel circuit.
Figure 9:
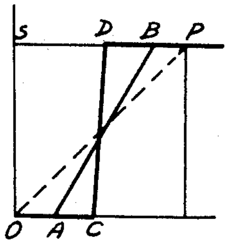
Fig. 9 shows various transfer characteristic curves explaining the advantages of the circuitry employed in the present invention.

The bias voltage $+B_1$ is added to the alternating component from the transformer and the resulting wave shape is indicated by curve A in Fig. 2B which is plotted against the clock source CP voltage represented by curve B. Because of such arrangement it will be obvious that the bias voltage $+B_1$ tends to keep the input diode $D_i$ of any subsequent stage (see Fig. 3) back biased and at no time during the first half-cycle will there be more than a small difference in potential between the electrodes of the input diode. During the interval in which the upper half of the clock half-sine wave is applied, the cathode of the input diode $D_i$ in a subsequent stage will at least be equal to or above that of the anode potential. Similarly during the negative half-cycle of the clock signal, the cathode of the input diode will be near to or above the anode potential. Therefore little or no current flow will take place in the clock diode $D_k$ and the subsequent stage will operate in a "one" mode. Such action illustrates the transfer of "ones" from a preceding to a subsequent stage. A stage may also be paralleled to drive a number of stages as illustrated in Fig. 4.

*Binary "zero" mode.*—The basic circuit illustrated in Fig. 1 can also be operated according to a binary-zero mode of operation by either connecting the input terminal P to a $+B_1$ voltage source (from a preceding stage which is transmitting zeros) or by closing switch SW1 if no previous stage is employed. As in the case of a binary-one mode of operation, at the beginning of a positive half-clock cycle, the cathode of clock diode $D_k$ is at ground and all of the current $i_p$ flows through the clock diode. Similarly as the potential on the cathode of $D_k$ increases with the clock pulse, a portion of the $i_p$ current is caused to flow through the reactor primary $T_1$. In this case however, such portion of the current cannot reach the referred-to steady state value characterizing a binary-one mode because the input diode $D_i$ clamps terminal 104 to a potential level corresponding to $+B_1$ and $+B_1/R_s$ is considerably less than such referred-to steady state value of the current through primary winding $T_1$. When the clock signal raises the potential at the cathode of $D_k$ above the value $+B_1$, the diode is cut off and the remainder of the current $i_p$ in this case is diverted through input diode $D_i$. In this manner, the input diode $D_i$ functions to divert and limit the amplitude of the current flowing through the core-magnetizing circuit including the primary winding $T_1$.

Referring again to the hysteresis diagram of Fig. 2A, it will be apparent that the core $T_c$ is initially in a state represented by position 1 on the curve at the beginning of a positive half-cycle of the clock because of the polarity of clock diode $D_k$. It will be recalled that a binary one mode of operation, the core 1 is driven through the paths 1, 2, 3 during a positive half-cycle of the clock signal and was left in state $+B_r$, and during the negative half-cycle of the clock, the core is driven through the path $+B_r$, 4,5,1 to the state $-B_r$.

When operating according to a zero mode the core remains in the state $-B_r$ throughout a positive clock half-cycle because the magnitude of the magnetizing portion of the current $i_p$ through the primary winding $T_1$ due to the limiting action of input diode $D_i$ is never great enough as has been explained above to drive the core past the knee portion 2 of its hysteresis loop. On the occurrence of the negative half-cycle of the clock signal, the clock diode $D_k$ will again begin to conduct with the result that the core is driven in the direction indicated by the dotted arrow in Fig. 2A through the path

1—5—6—5—1 in accordance with the principles previously explained. Since the slope of the B—H loop in this region of operation is small, no effective transformer action occurs in the reactor T and the reactances of the primary and secondary windings $T_1$, $T_o$ remain very small. Therefore no significant output voltage is generated in the output winding $T_o$ and the reactance of such winding remains very low throughout a full clock cycle when operating in a zero mode. If the input terminal of a second repeater stage having the opposite clock phase is connected to the output terminal of the first stage, as in Fig. 3 while it is operating in a zero mode, the second stage will also be forced to operate in the zero mode. Such action constitutes the transmission of a zero from the first stage to the second.

The values of the resistor $R_s$ is chosen so that the IR drop across the resistor occasioned by the magnetizing current approximately equals the voltage required to reset the core of the reactor at the particular clock frequency employed. Specifically such IR drop is approximately one-half of the peak amplitude of the clock signal.

The ultimate practical limitation on the number of similar stages which a stage can drive is determined by the magnitude of the saturation inductance of the output winding $T_o$. Because the aggregate pull-up current of all the driven stages flows through this inductance in "zero" mode transmission, a positive counter-e.m.f. $e_x$ is developed across it. The time integral of $e_x$ is proportional to the output winding saturation inductance $L_o'$ and to the aggregate pull-up current. If $\int e_x dt$ gets too large, a spurious "one" may be transmitted. In general a certain maximum fraction, $$S=\frac{\int_0^{t/2} e_x dt}{\int_0^{t/2} e_k dt}$$

of clock voltage time area $\int e_k dt$ can be tolerated where $t$ represents the full time period of a clock pulse. If it is assumed that the pull-up current $i_p$ is practically equal to the magnetizing current $i_m$ then $$S=\frac{\int_0^{t/2} e_x dt}{\int_0^{t/2} e_k dt}=\frac{\nu i_m L_o'}{\int_0^{t/2} e_k dt}$$

Where $\nu$ is the maximum number of like stages which can be driven, $\nu$ may be called the logical amplifying power or maximum logical gain of the stage. Solving for $\nu$ gives $$\nu=\frac{S\int_0^{t/2} e_k dt}{i_m L_o'}$$

If a 2:1 step-up ratio is assumed, $$L_o'=4L_1'$$

where $L_1'$ represents the saturation inductance of $T_1$.

Referred to the input winding, then $$\nu \sim \frac{S\int_0^{t/2} e_k dt}{4_{im} L_i'}$$

Representing the nonsaturated inductance of $T_i$ by $L_i$ one has $$L_i \sim \frac{\int_0^{t/2} e_k dt}{2i_m}$$

which, on substituting, gives $$\nu \sim S\frac{L_i}{L_i'}$$

This shows the logical amplifying power of the stage to be proportional to the ratio of the unsaturated to the saturation value of the inductance of the core winding.

For a given core material the inductance of a winding is proportional to $$\frac{An^2}{\lambda}$$

where A is the core cross-sectional area, $n$ is the number of turns in the winding, and $\lambda$ is the mean length of the flux-path in the core. The clock voltage amplitude $e_k$ from source CP which is required to drive the core around its major loop is proportional to the product $An$. Without varying the required clock amplitude, it is possible to change the impedance of core windings either by changing $\lambda$ or by varying A and $n$ such that the product $An$ remains unchanged. Thus the impedance of a winding is proportional to $$\frac{n}{\lambda}$$

This provides the basis for constructing a multi-stage repeater having a much higher overall logical amplifying power than a single stage. If a stage (call it type 1) having a certain impedance level is capable of repeating to $\nu$ stages, like itself, then it is capable of repeating to one stage (call it type 2) having an impedance level $1/\nu$ times that of the type 1. Then if the type 2 stage can repeat to stages like itself, it can repeat to $\nu^2$ type 1 stages. Thus the logical amplifying power of a repeater made up of a type 1 stage and a type 2 stage cascaded is $\nu^2$. The amplifying power of an N-stage repeater built up in the same manner, of progressively lower-impedance stages, is $\nu^N$. The delay through the repeater is $N/2$ clock cycles.

Figure 5:
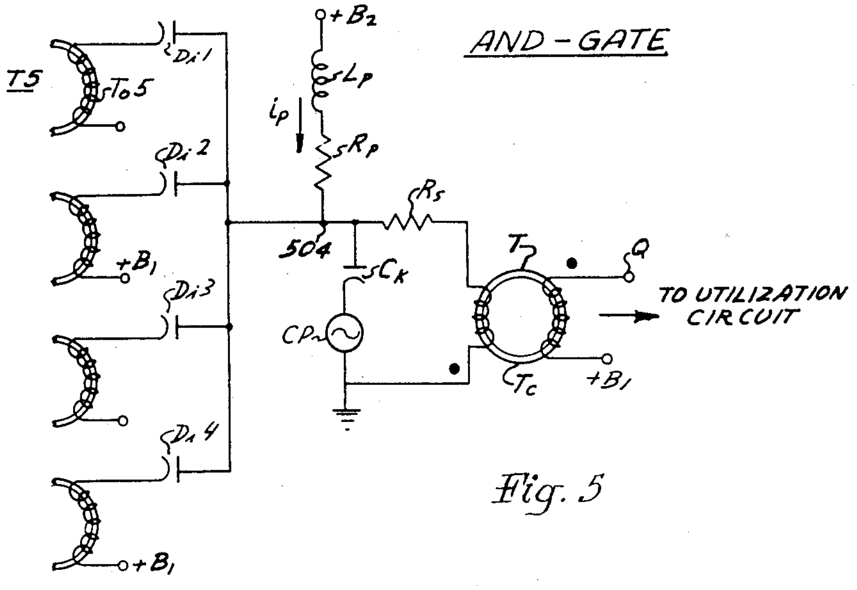
Fig. 5 is a circuit diagram illustrating a form of the invention employed as a logical and-gate.

The principles of the present invention can readily be implemented in the form of a logical and-gate in the manner illustrated in Fig. 5. To form a logical and-gate, a plurality of input diodes such as $D_i1$—$D_i4$ are provided. The and-gate stage receives a binary signal from as many previous stages as there are input diodes $D_i$. One previous stage as represented by the partially shown reactances $T_5$ is connected to each input diode. The anode electrodes of the input diodes are connected in parallel to the common terminal 504 in a manner corresponding to the circuit construction described in connection with Fig. 1. Each cathode electrode of the diodes $D_i1$—$D_i4$ is connected to a respective secondary winding $T_o5$ of the input saturable core reactors $T_5$. Each of the secondary windings is biased to an amplitude corresponding to $+B_1$ as indicated.

The combination of the input diodes $D_i1$—$D_i4$ with the clock generator CP and clock diode $D_k$ results in a coincidence circuit or and-gate. The operation of such circuit is such that a binary "one" is transmitted to a utilization circuit if and only if binary "one" signals are present at all input diodes. Otherwise, a binary zero is transmitted. The functioning of the circuit shown in Fig. 5 as a coincidence or and-gate will be apparent by recalling the mode of operation of the basic circuit described in connection with Fig. 1. The value of the bias voltage $+B_1$ applied to the cathode of each input diode $D_i1$—$D_i4$ in Fig. 5 is slightly above ground potential as previously mentioned and is therefore such as to render each of the input diodes partially conducting. Conduction of an input diode, as previously explained, results in diversion of a sufficient amount of the current $i_p$ from the magnetizing circuit for reactor T to prevent magnetization of the core $T_c$. The input signals applied to each of the input reactors $T_5$ are such as to manifest a positive voltage on the cathode electrode in each of the input diodes $D_i1$—$D_i4$ of a magnitude sufficient to produce cutoff thereof. However, if an input signal is absent from one or more of the input diodes, there will still remain sufficient diversion of the $i_p$ current therethrough to prevent magnetization of the output core $T_c$. When, and only when, signals are applied concurrently to each of the input diodes, so as to produce cutoff in each diode, will the $i_p$ current behave in the manner described in connection with the "ones" mode of operation of Fig. 1 to produce magnetization of the output core $T_c$. It is important to realize that no increase in the current $i_p$ for the and-gate shown in Fig. 5 is necessary. The current is simply divided among the inputs to the gate. Each input diode $D_i1$—$D_i4$ passes only $1/n$th of the total current $i_p$ during the transmission of binary "zeros." During the transmission of binary "ones," there is no current flow in the input diodes.

Figure 6:
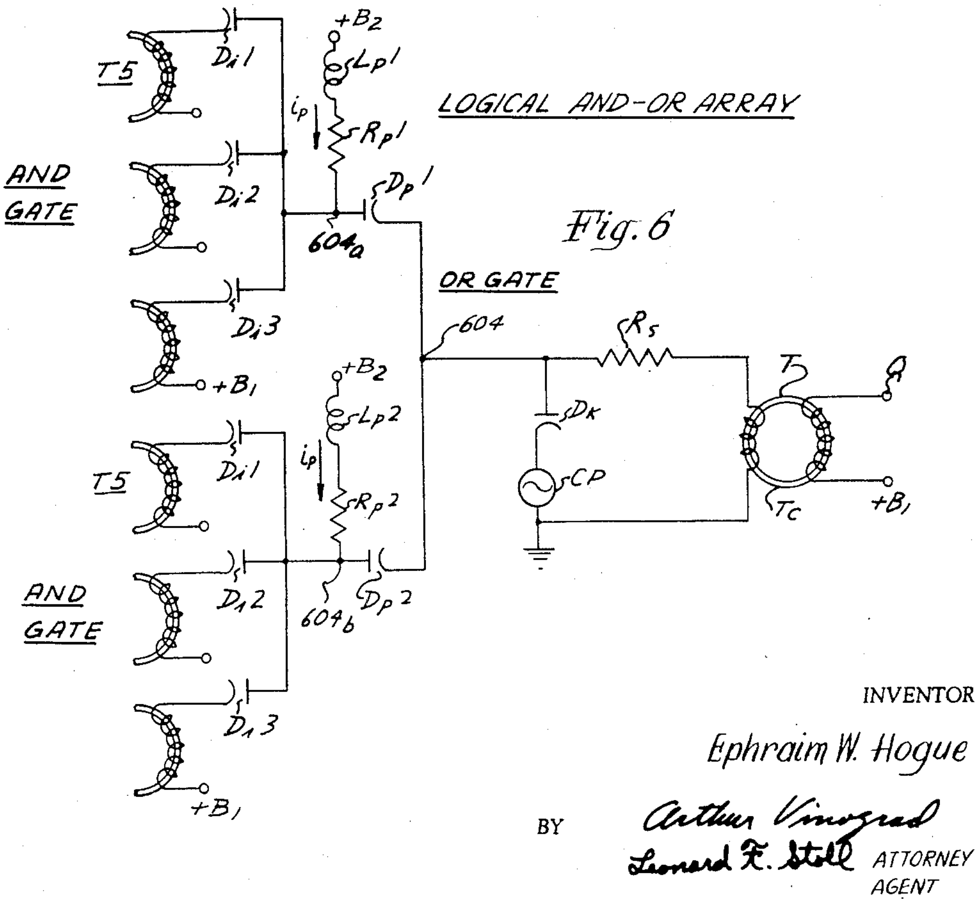
Fig. 6 is a circuit illustrating the invention employed as a two-level logical array of gates.

Fig. 6 shows the present invention embodied as a logical and-or arrangement. A plurality of input reactors T5 and input diodes $D_i1$—$D_i3$ similar to those employed in the and-gate (Fig. 5) are employed to receive the input signals. The input reactors and diodes are arranged in groups as indicated in Fig. 6, each group being connected to a respective common terminal 604*a*, 604*b*. Each of such terminals is connected to a $+B_2$ potential source through a corresponding impedance $L_p1$, $L_p2$ and resistance $R_p1$, $R_p2$. The terminals 604*a* and 604*b* are in turn connected to common terminal 604 through respective additional diodes $D_p1$ ond $D_p2$. The remainder of the circuit shown in Fig. 6 corresponds structurally to both Figs. 1 and 5 and includes a reactor T, clock pulse source CP, clock diode $D_k$, and resistor $R_s$.

Application of a positive signal representing a binary number to any one of the input diodes $D_i1$ etc. which are normally conducting as previously indicated in connection with Fig. 5 will produce cutoff of such diode. Since the cathodes of any remaining input diode to which no signal has been applied will be in a conducting state, the anode of the respective $D_p$ diode will be held at the $+B_1$ level. The remainder of the circuit functions in exactly the same manner as was described in connection with Fig. 1 to produce magnetization of output core $T_c$ when a signal is concurrently applied to all the inputs of either and-gate.

Fig. 7 shows a modification of this invention embodied in a circuit providing logical inhibition; that is, an output signal is obtained which is complementary to or opposite to an applied input signal.

The circuit shown in Fig. 7 comprises an "A" stage, a "B" stage and a "C" stage. The "A" stage is identical to the basic stage described in connection with Fig. 1 and includes a reactor TA, a first source of clock pulses CP1, a clock diode $D_k1$ and input diode $D_iA$. Signals are applied to the input diode through an input reactor D7*a* as indicated.

The output winding of reactor TA in the "A" stage is connected to a clock source CP2 having an opposite phase relative to a source CP1, through a coupling diode $D_M$ and to a bias potential $+B_1$ through a second coupling diode $D_N$. State "A" is connected to the "B" stage through resistor $R_s2$. Stage "B" includes a clock source CP3 having the same phase as source CP2 and a clock diode $D_k2$. The output of stage "B" is applied as one input to a logical and-gate of the type described in connection with Fig. 5 comprising the diodes $D_i1$, $D_i2$, clock pulse source CP4 and clock diode $D_k3$. The second input to the and-gate includes the reactor T7*b* as indicated.

When a "zero" is applied to the input of stage "A" through input reactor T7*a* or by other means such as a switch as previously described, a "one" is obtained from stage B. Conversely, the application of a "one" as an input to stage "A" produces a "zero" output at stage "B." When stage "A" is operating in a "zero" mode, as described in connection with Fig. 1, the output winding of reactor $T_A$ will have a very low impedance and no E.M.F. will be generated. The effect of CP2 will then be to cyclically magnetize or reset the reactor $T_B$ because the low inductance of a secondary of $T_A$ when its core is unmagnetized will permit transmission of the positive portions of the signals from CP2 through $R_s2$ to the primary of reactor $T_B$. The "ones" thus received by $T_B$ are transmitted to the portion of the circuit identified in Fig. 7 as an and-gate. In this manner inhibition of a signal is effected by introducting the signal and its complement to an and-gate. The complementer made up of stages "A" and "B" provides signal complements to the and-gate to inhibit, at its output, the signal from input 2.

When stage "A" is operating in a "ones" mode, an output E.M.F. is developed in the secondary of $T_A$ as described and the polarity and amplitude of such signal effectively opposes and cancels the positive signal from source CP2. The diode $D_N$ and potential source $+B_1$ biases the output winding of $T_A$ slightly positive in such case and insures that diode $D_M$ remain open, thus effectively disconnecting the source CP2 completely. The core of reactor $T_B$ is not reset and stage "B" continually transmits "zeros" to the and-gate. As a result, the application of "ones" to "input 2" (reactor T7*b*) will produce no output at reactor $T_c$. The transmitter pulse for stage "B" is always available from clock source CP2 through the resistor $R_s'2$ paralleling $R_s2$. Only the reset pulse from CP2 is eliminated by the introduction of "ones" at input 1. The diode $D_N$ moreover, provides a clamping action which prevents any current generated when CP3 is negative from flowing in the output winding of reactor $T_A$. The value of $R_s'2$ is ½ the value of $R_s2$ to provide the normal current for core $T_B$ plus that caused by the unavoidable shunting of $R_s2$.

The portion of the circuit shown in Fig. 7 represented by the reactors T7*b* and $T_B$, the diodes $D_i1$, $D_i2$, clock pulse source CP4 and clock diode $D_k3$ and related circuitry comprises an and-gate identical in construction and mode of operation to the and-gate discussed in connection with Fig. 5. The output from reactor $T_B$ provides a first input to the and-gate while reactor T7*b* provides a second and-gate input. In accordance with the above-described operation of the circuit of Fig. 7, it will be clear that when a "zero" is applied by input reactor T7*a* (input 1), the described resetting of reactor $T_B$ results in an inductive effect on its secondary winding with the consequent application of an output signal corresponding to a binary "1" as a first input to the and-gate. If, and only if, there is a concurrent application of a binary "1" signal by reactor T7*b* as a second input to the and-gate a binary "1" will be manifested at output reactor $T_c$.

Should a binary "1" signal be applied at input reactor T7*a*, the resulting "repeater" action of stage "A" in accordance with the description of the circuit shown in Fig. 1 will cause resetting of reactor $T_A$ because of the magnetizing current in the reactor primary. The effect of such resetting is to induce a signal in the secondary of $T_A$ which effectively cancels the clock pulse signal applied by CP2. Such action therefore prevents resetting of reactor $T_B$ and no output is manifested by the secondary of reactor $T_B$. Therefore the application of a binary "1" input signal by reactor T7*b* will have no effect, and no output will be obtainable at $T_c$.

Fig. 8 shows the signal complementing circuit of Fig. 7 incorporated in a typical packaged computer component. It will be recognized that the portion of the circuit included in the left-hand portion of Fig. 8 comprises a logical and-or arrangement identical in construction to the corresponding gate described in connection with Fig. 6. The remainder of the circuit in Fig. 8 corresponds to the complementing circuit described in connection with Fig. 7. The elements in Fig. 8 corresponding to like parts in Fig. 7 are identified with corresponding reference designations. It will be noted that the reactor T7*b* providing the second input to the and-gates is shown in Fig. 8 as forming part of a basic circuit such as shown in Fig. 1, an additional secondary winding being provided on the core of reactor $T_A$ to provide a circuit for the primary winding of T7*b*.

The arrangement of Fig. 8 is such as to provide both a direct and complement output. That is, it is a basic circuit having sufficient flexibility for adaptation in a computer circuit depending on the logical requirements of the circuit.

It will be apparent that the embodiments shown are only exemplary and that various modifications can be made in construction and arrangement within the scope of the invention as defined in the appended claims.

What is claimed is:

1. A saturable core logical circuit comprising a saturable core reactor of the type including a core having a square loop hysteresis characteristic and a primary and secondary winding, an energizing circuit including said primary winding for magnetizing said core to either one of two remnant states of magnetization, said energizing circuit comprising a source of magnetizing current, impedance means connecting said source to one terminal of said primary winding, the other terminal of said primary winding being grounded, gating means for controlling the magnitude of current in said energizing circuit, said gating means comprising asymmetrical conducting means having one electrode connected to said source of magnetizing current, said asymmetrical conducting means being poled to be normally conducting with respect to said magnetizing current source, said gating means including means connected to the other electrode of said asymmetrical conducting means and to ground for cyclically biasing said asymmetrical conducting means to alternate states of cut-off and conductivity with respect to said source, and means for applying a constant potential bias to one terminal of said secondary winding.

2. The invention of claim 1 including an additional asymmetrical conducting device having one electrode connected to the portion of said energizing circuit comprising the connection between said one electrode of said gating asymmetrical conducting means and said source of magnetizing current, said additional asymmetrical conducting device being poled so that it will be biased to cut-off when said cyclical biasing means drives said gating asymmetrical conducting means to conduction.

3. The invention of claim 2 including a plurality of saturable core logical circuit stages as defined in claim 2, and in which the other electrode of said additional asymmetrical conducting device in a subsequent stage is connected to the second terminal of said secondary winding of the saturable core reactor of a preceding stage.

4. A saturable core logical and-or gate circuit comprising a saturable core reactor having substantially a square loop hysteresis characteristic, a primary and at least one secondary winding wound on said core, a magnetizing circuit including said primary winding for magnetizing said core to either one of two states of remnant magnetization including a resistor connected to one terminal of said primary winding, the other terminal being grounded, means for applying magnetizing current to said magnetizing circuit in response to applied signals representing binary quantities, said means comprising a plurality of groups of signal-input saturable core reactors each having a substantially rectangular hysteresis loop, at least one winding on each of said groups of cores, first asymmetrical conducting means connecting one terminal respectively of each winding of each group of cores in parallel to a D.C. source through separate respective impedance means corresponding to each group, said first asymmetrical conducting means being poled to be normally conducting with respect to said D.C. source, second asymmetrical conducting means corresponding to each group respectively connecting said impedance means in parallel to said resistor, said second asymmetrical conducting means being poled to normally conduct with respect to said D.C. source, said magnetizing circuit further including means for controlling the magnitude of said magnetizing current comprising a grounded source of signals of alternating polarity and an asymmetrical conducting device connecting said signal source to said resistor, said asymmetrical conducting device being poled to be normally conducting with respect to said D.C. source.

5. A saturable core logical coincidence-gate circuit comprising a saturable core reactor of the type including a core having a square loop hysteresis characteristic and a primary and secondary winding, an energizing circuit including said primary winding for magnetizing said core to either one of two states of remnant magnetization, said energizing circuit comprising a source of D.C. potential, impedance means connecting said potential source to one terminal of said primary winding the other terminal of said primary winding being grounded, gating means for controlling the magnitude of current in said energizing circuit including a grounded source of signals of alternating polarity and an asymmetrical conducting device connecting said signal source to said impedance means said asymmetrical conducting device being poled to normally conduct current from said D.C. potential source, a group of saturable core reactors each having a substantially rectangular hysteresis characteristic and a secondary winding, a second asymmetrical conducting device in each group reactor connecting one terminal of each of said secondary windings in said group to said impedance means, the other terminal of each of said secondary windings in said group being connected to a D.C. potential bias source, each of said second asymmetrical conducting devices being poled so it will be biased to cutoff when the polarity of said signal source renders said first-mentioned asymmetrical conducting device conducting.

6. A saturable core logical signal complementing circuit comprising a first saturable core reactor of the type including a core having a square loop hysteresis characteristic and a primary and secondary winding, circuit means including said primary winding for magnetizing said core to either one of two remnant states of magnetization, said circuit comprising a resistor connected to one terminal of said primary winding, the other terminal thereof being grounded a source of magnetizing current connected to said resistor, said magnetizing circuit further comprising asymmetrical conducting means connected to said magnetizing current source and poled for conduction with respect to said current source and a grounded source of signals of alternating polarity connected to said asymmetrical conducting means for variably biasing said asymmetrical conducting means to alternate states of conducting for determining the magnitude of current in said magnetizing circuit, a second saturable core reactor having a substantially rectangular hysteresis characteristic and a primary and secondary winding, second circuit means including said second saturable core reactor primary and the secondary of said first saturable core reactor for magnetizing said second core to either one of two remnant states of magnetization, said second magnetizing circuit comprising second asymmetrical conducting means and a second grounded source of signals of alternating polarity having a phase opposite to that of said first signal source connected in parallel across the primary of said second saturable core reactor, said second asymmetrical conducting means being poled in the same direction as said first asymmetrical conducting means.

7. The invention of claim 6 in which the secondary of said first saturable core reactor is connected to a like-poled first and second asymmetrical conducting device, a third signal source of alternating polarity and having a phase opposite to that of said first signal source connected between ground and said first asymmetrical conducting device for variably biasing said first asymmetrical conducting device to alternate states of conductivity and means for biasing said second asymmetrical conducting device to conduction when said first asymmetrical conducting device is cut off.

8. The invention of claim 7 including third asymmetrical conducting means having one electrode connected to said first magnetizing circuit and means biasing the other electrode of said third asymmetrical conducting means slightly above ground potential, said third asymmetrical conducting device being poled with respect to said magnetizing current source so as to be driven to cutoff when the polarity of said first signal source renders said first asymmetrical conducting device conducting.

References Cited in the file of this patent

UNITED STATES PATENTS

| | | |
|---|---|---|
| 2,683,819 | Rey | July 13, 1954 |
| 2,709,798 | Steagall | May 31, 1955 |
| 2,741,758 | Cray | Apr. 10, 1956 |
| 2,742,632 | Whitely | Apr. 17, 1956 |
| 2,792,506 | Torrey | May 14, 1957 |
| 2,792,507 | Eckert | May 14, 1957 |
| 2,838,746 | Eckert | June 10, 1958 |